ical acid amide and an N-vinyl lactam. lactam.
United States Patent Office 2,808,383
Patented Oct. 1, 1957

2,808,383

PRODUCTION OF WATER-SOLUBLE METHYLOL COMPOUNDS OF COPOLYMERS OF AN N-VINYL LACTAM AND AN ACRYLIC ACID AMIDE AND PRODUCT OBTAINED

Hans Fikentscher and Hans Wilhelm, Ludwigshafen (Rhine), Germany, assignors to Badische Anilin- & Soda-Fabrik Aktiengesellschaft, Ludwigshafen (Rhine), Germany No Drawing. Application April 4, 1955,
Serial No. 499,224

Claims priority, application Germany April 3, 1954

13 Claims. (Cl. 260—29.4)

This invention relates to new water-soluble methylol compounds of copolymers and to a process of producing such compounds. More particularly, the invention is directed to methylol compounds of copolymers of an unsaturated carboxylic acid amide and an N-vinyl lactam.

It has already been proposed to polymerize methylol compounds of unsaturated polymerizable acid amides, as for example methacrylic acid amide or acrylic acid amide, in aqueous solution while using the usual catalysts. Furthermore polymethacrylamide or polyacrylamide have already been reacted with formaldehyde. The aqueous solutions of such products, however, have, either from the start or after short storage, a gelatinous nature which is detrimental for many purposes, as for example in the textile industry. Moreover they are not capable of unlimited dilution, but have only a limited capacity for swelling.

It is an object of this invention to provide new and improved methylol compounds of copolymers. Another object of the invention is a method of manufacturing such methylol compounds. A further object of the invention is to provide good water-soluble hardenable methylol compounds of a copolymer of an unsaturated carboxylic acid amide and an N-vinyl lactam and stable aqueous solutions of said methylol compounds. It is a still further object to provide new emulsifying, dispersing, thickening and binding agents, which are new methylol compounds of the said copolymers of an unsaturated carboxylic acid amide and an N-vinyl lactam.

These and other objects are accomplished according to this invention by reacting copolymers of unsaturated carboxylic acid amides and vinyl lactams in aqueous medium at a pH above 5, preferably in the alkaline range up to pH 11, with formaldehyde. It is preferable to use 0.5 to 2.5, advantageously 1 to 2, mols of formaldehyde for each amide group, the solutions, which may have an alkaline reaction, if desired, being rendered neutral as soon as the formaldehyde has reacted with the copolymer.

The resulting products, obtained in aqueous solution, contrasted with the known methylol compounds of polyacrylamide or polymethacrylamide, do not change into a gelatinous state, but form stable, mobile solutions capable of dilution to any extent, so that they have a considerable wider range of application. It is also important that these copolymers from unsaturated acid amides and vinyl lactams can be reacted in aqueous solution in high concentrations, as for example in 20% solution, with formaldehyde, aqueous solutions very well capable of being stored also being obtained. As a rule the solutions to be reacted with formaldehyde should contain 5 to 25% of copolymer. The formaldehyde may be preferably used in the commercial 25 to 40% aqueous solution. Instead of formaldehyde the homopolymers of formaldehyde, e. g. paraformaldehyde, may be used. Reaction occurs within a few hours at room temperature. In order to accelerate the reaction, the reaction solution can be heated for a short time to a moderate temperature, as for example for 10 minutes at 50° C. As a rule the reaction temperature may be varied between 10° and 90° C. and the reaction time between 2 minutes and some days, the necessary reaction time increasing with a drop in the reaction temperature. The pH-range should lie between 5 and 11, preferably between 7.5 and 10.5.

The copolymer to be used for the reaction with formaldehyde should preferably contain 5 to 50% by weight of a vinyl lactam polymerized into the same. Suitable vinyl lactams are for example N-vinylpyrrolidone-(2), ω-N-vinylcaprolactam and the N-vinyl lactam of ω-caprylic acid. Methacrylamide and acrylamide and their derivatives which contain at least one hydrogen atom attached to nitrogen are eminently suitable as unsaturated amides. The copolymers may also contain a plurality of unsaturated amides and a plurality of vinyl lactams and also small amounts of other polymerizable components, such as vinyl methyl ketone, acrylonitrile, vinyl acetate, or methyl acrylate. The k-value of the copolymers should amount to at least 25 as a rule.

The highly viscous aqueous solutions of the said new formaldehyde reaction products are suitable for all the purposes of use for which highly viscous aqueous solutions are required. When allowed to dry at room temperature, either alone or in admixture with compounds capable of reacting with formaldehyde, they leave behind a water-insoluble, clear, transparent, hard film. They may therefore be used alone or as additional agents in the production of waterproof impregnations, finishes or coatings on textiles, leather, paper and wood and as adhesives. Obviously they may also be further cross-linked at higher temperatures or there may be added thereto the usual hardening agents, as for example acids, ammonium nitrate, toluene sulfochloride and other compounds which split off acid, to accelerate the condensation. Mixtures thereof with the same copolymers which have not been reacted with formaldehyde, or similar copolymers with a different mixing proportion of unsaturated carboxylic acid amide and vinyl lactam or with homopolymers of methacrylamide and/or acrylamide, are also of interest. From such mixtures there are obtained films, impregnations and finishes which exhibit a very good stability to soaps. Furthermore, however, all products are suitable for further condensation which contain reactive amide groups, as for example casein, gelatin, urea and melamine, thus giving an extensive possibility of variation as regards special properties. Such mixtures can be stored well.

The excellent emulsifying and dispersing action of the new methylol compounds for the greatest variety of substances and their use as thickening and binding agents is of special interest. When substances which have been dispersed with their aid in aqueous medium are spread out, there are obtained, even by drying at room temperature, by cross-linking of the methylol groups, waterproof coatings of which the stability to water can be further improved by drying at raised temperatures, as for example at 80° to 120° C., and by the addition of known hardening agents for methylol compounds, as for example ammonium salts. The coatings are also stable to dilute alkalies.

Contrary to expectation, the viscous solutions of the methylol compounds of copolymers of unsaturated amides and vinyl lactams are also suitable as protective colloids in the production of latex-like stable polymer dispersions from unsaturated polymerizable compounds which are insoluble or only slightly soluble in water, as for example vinyl esters of organic acids, such as vinyl acetate or propionate, esters of unsaturated carboxylic acids, such as acrylic acid esters and methacrylic acid esters, and vinyl halides, as well as mixtures of these and other monomers. By their addition, the stability to water of films, coatings and paints which have been prepared from such dispersions is improved. As a rule aqueous compositions containing the new methylol compound according to this invention should contain between 2% and 30% by weight of the methylol referred to the weight of the solution.

With the new formaldehyde reaction products it is also possible to manufacture, if desired with the coemployment of wetting agents or soaps, aqueous emulsions or dispersions of substances which are insoluble or difficultly soluble in water, as for example oils, fats, waxes, high molecular weight film-forming substances, and organic and inorganic color pigments. In this case also it is of advantage in many cases that the said formaldehyde reaction products increase the water-repellency of such preparations after drying. In contrast thereto, most of the usual dispersing and emulsifying agents worsen the water-repellency of coatings from such mixtures. By reason of their viscosity, the new assistants can also be used as thickening agents for solutions, emulsions and dispersions.

The following examples will further illustrate this invention but the invention is not restricted to these examples. The parts are parts by weight.

*Example 1*

265.6 parts of a 20% aqueous solution of a copolymer of 80% of methacrylamide and 20% of N-vinylpyrrolidone with a k-value according to H. Fikentscher, Cellulose-chemie, 13 (1932) 58, of 38, determined in an aqueous solution, are diluted with 372.6 parts of water and then stirred with 37.5 parts of a 40% aqueous formaldehyde solution and 5.5 parts of a 4% caustic soda solution. Within about 3 hours at room temperature, the water-soluble methylol compounds of the copolymer form. This reaction proceeds within about 10 minutes at 50° C.

The aqueous solution obtained only changes slightly in viscosity with time and does not assume a gelatinous nature. Its viscosity behavior upon storage at room temperature may be seen from the following table:

| Days after preparation | Flow time in seconds in a Ford beaker No. 4 at 25° C. |
|---|---|
| 0 | 20.0 |
| 5 | 22.5 |
| 20 | 24.0 |
| 30 | 25.0 |
| 70 | 29.0 |

Coatings made with this solution leave behind a hard, transparent, water-insoluble film on drying.

The methylol compounds of the said copolymer are also suitable as emulsifying, thickening and binding agents.

*Example 2*

333.3 parts of a 15% aqueous solution of a copolymer of 85% of methacrylamide and 15% of vinylpyrrolidone with a k-value of 34.5 are stirred vigorously with 62.5 parts of water, 37.5 parts of a 40% formaldehyde solution and 4.2 parts of a normal caustic soda solution. A 15% solution of a water-soluble reaction product of the copolymer is obtained which leaves behind upon drying at ordinary temperature a hard, transparent, water-insoluble film. The formation of a water-insoluble film takes place at once if heated for 10 minutes at 50° C. This solution does not assume a gelatinous state and its viscosity changes only very slowly after a slight rise in the first 24 hours after preparation. The following table shows the measured viscosity values:

| Days after preparation | Flow time in seconds in a Ford beaker No. 6 at 25° C. |
|---|---|
| 0 | 124.0 |
| 1 | 145.0 |
| 8 | 152.0 |
| 19 | 152.0 |
| 27 | 152.5 |

*Example 3*

333.3 parts of a 15% aqueous solution of a copolymer of 85 parts of methacrylamide and 15 parts of ω-N-vinylcaprolactam having a k-value of 30 are reacted with an equal amount of formaldehyde in the same manner as described in Example 2, except that the reaction temperature is 70° C. A viscous solution is obtained which can be stored for a long time.

*Example 4*

The other data and conditions being as in Example 3, a copolymer of 71 parts of acrylamide and 29 parts of ω-N-vinylcaprolactam is reacted with formaldehyde. A viscous solution of the methylol compound formed is obtained.

*Example 5*

The other data and conditions being as in Example 3, a copolymer of 42.5 parts of methacrylamide, 35.5 parts of acrylamide and 22 parts of vinyl-pyrrolidone is reacted with formaldehyde. The methylol compound formed is obtained as a viscous solution which can be stored for a long time.

*Example 6*

A mixture of 1000 parts of vinylpropionate, 600 parts of water and 400 parts of a 10% aqueous solution of a water-soluble reaction product of 23.08 parts of formaldehyde (calculated on 100% formaldehyde) and 76.92 parts of a copolymer from 85% of methacrylamide and 15% of N-vinylpyrrolidone is kept at a temperature of from 80° to 85° C. for 3 hours while stirring, after adding 5 parts of potassium persulfate and 2.5 parts of sodium acrylate. When the polymerization is complete, the temperature is allowed to rise to 92° C. A stable viscous polymer dispersion is obtained with a time of 78 seconds in a Ford cup viscometer No. 5.

*Example 7*

40 parts of a pigment blend consisting of equal parts of ferric oxide and chromic oxide are intimately mixed with 160 parts of a 10% solution of a formaldehyde reacted copolymer from 70 parts of methacrylamide, 10 parts of acrylamide and 20 parts of N-vinylcaprolactam. The dispersion so obtained can be used as a paint or as an additive for coating agents, for example coating emulsions. Dried paints prepared from the said formaldehyde reacted copolymers are more resistant to water than those prepared from the same copolymers which have not been reacted with formaldehyde.

*Example 8*

54 parts of a 37% aqueous copper phthalocyanine press cake are intimately mixed in a paint mill with 146 parts of a 10% solution of the methylol compound of a copolymer from 70% of methacrylamide and 30% of N-vinylpyrrolidone, a stable color dispersion being obtained. To this dispersion 46.6 parts of a 10% aqueous solution of a copolymer from 94% of methacrylamide and 6% of vinylpyrrolidone are added while stirring. Then 0.5 part of ammonium nitrate is entered. Paints prepared from this dispersion, when dried on at 70° to 100° C., have a good resistance to water.

Example 9

50 parts of olive oil are mixed while stirring with 49.5 parts of a 10% solution of a reaction product of 22 parts of formaldehyde and 78 parts of a copolymer from 80% of methacrylamide and 20% of vinylpyrrolidone as well as 0.5 part of an ethylene oxide reacted castor oil. There is obtained a creamy and stable oil emulsion which can be well thinned. The emulsifying action of the condensate is superior to that of the unreacted copolymer from 80% of methacrylamide and 20% of N-vinylpyrrolidone.

We claim:

1. A water-soluble methylol compound of a copolymer of an N-vinyl lactam and at least one unsaturated carboxylic acid amide selected from the class consisting of acrylic acid amide and methacrylic acid amide, said copolymer containing from 5 to 50% by weight of copolymerized vinyl lactam.

2. A water-soluble methylol compound of a copolymer of an acrylic acid amide and an N-vinyl lactam, said copolymer containing from 5 to 50% by weight of said copolymerized vinyl lactam.

3. A water-soluble methylol compound of a copolymer of a methacrylic acid amide and an N-vinyl lactam, said copolymer containing from 5 to 50% by weight of said copolymerized vinyl lactam.

4. A water-soluble methylol compound of a copolymer of methacrylic acid amide and N-vinyl pyrrolidone, said copolymer containing from 5 to 50% by weight of said copolymerized N-vinyl pyrrolidone.

5. A water-soluble methylol compound of a copolymer of an acrylic acid amide, a methacrylic acid amide and an N-vinyl lactam, said copolymer containing from 5 to 50% by weight of said copolymerized vinyl lactam.

6. A water-soluble methylol compound of a copolymer of acrylic acid amide, methacrylic acid amide and N-vinyl pyrrolidone, said copolymer containing from 5 to 50% by weight of said copolymerized vinyl lactam.

7. A water-soluble methylol compound of a copolymer of acrylic acid amide, methacrylic acid amide and N-vinyl caprolactam, said copolymer containing from 5 to 50% by weight of said copolymerized vinyl lactam.

8. An aqueous solution of a methylol compound of a copolymer of methacrylic acid amide and N-vinyl pyrrolidone, said copolymer containing from 5 to 50% by weight of said copolymerized N-vinyl pyrrolidone and said solution containing from 2 to 30% by weight of the said methylol compound with reference to the weight of the aqueous solution.

9. An aqueous solution of a methylol compound of a copolymer of acrylic acid amide, methacrylic acid amide and N-vinyl pyrrolidone, said copolymer containing from 5 to 50% by weight of said copolymerized N-vinyl pyrrolidone and said solution containing from 2 to 30% by weight of the said methylol compound with reference to the weight of the aqueous solution.

10. A process for the production of a water-soluble methylol compound which comprises reacting a copolymer of an N-vinyl lactam and an unsaturated carboxylic acid amide selected from the class consisting of acrylic acid amide and methacrylic acid amide, said copolymer containing from 5 to 50% by weight of copolymerized vinyl lactam, with formaldehyde in aqueous medium at a pH above 5.

11. A process for the production of a water-soluble methylol compound which comprises reacting a copolymer of an acrylic acid amide containing at least one hydrogen atom in the amide group and an N-vinyl lactam, said copolymer containing from 5 to 50% by weight of the said copolymerized N-vinyl lactam, with formaldehyde in aqueous medium at a pH between 5 and 11 and a temperature between 10° and 90° C.

12. A process for the production of a water-soluble methylol compound which comprises reacting a copolymer of methacrylic acid amide and N-vinyl pyrrolidone, said copolymer containing from 5 to 50% by weight of the said copolymerized N-vinyl pyrrolidone, with formaldehyde in aqueous medium at a pH between 5 and 11 and a temperature between 10° and 90° C.

13. A process for the production of a water-soluble methylol compound which comprises reacting a copolymer of acrylic acid amide, methacrylic acid amide and N-vinyl pyrrolidone, said copolymer containing from 5 to 50% by weight of the said copolymerized N-vinyl lactam, with formaldehyde in aqueous medium at a pH between 5 and 11 and a temperature between 10° and 90° C.

References Cited in the file of this patent

UNITED STATES PATENTS 2,173,005   Strain _____ Sept. 12, 1939